United States Patent
Fu et al.

(10) Patent No.: US 9,690,402 B1
(45) Date of Patent: Jun. 27, 2017

(54) SCANNING MIRROR TOUCH SCREEN

(75) Inventors: Yee-Chung Fu, Fremont, CA (US); Hsing C. Cheng, San Jose, CA (US)

(73) Assignee: ADVANCED NUMICRO SYSTEMS, INC., San Jose, CA (US)

( * ) Notice: Subject to any disclaimer, the term of this patent is extended or adjusted under 35 U.S.C. 154(b) by 1684 days.

(21) Appl. No.: 12/876,054

(22) Filed: Sep. 3, 2010

Related U.S. Application Data

(63) Continuation-in-part of application No. 12/727,945, filed on Mar. 19, 2010.

(60) Provisional application No. 61/239,680, filed on Sep. 3, 2009, provisional application No. 61/261,270, filed on Nov. 13, 2009.

(51) Int. Cl.
*G06F 3/041* (2006.01)

(52) U.S. Cl.
CPC .................................. *G06F 3/041* (2013.01)

(58) Field of Classification Search
USPC .................... 345/173–178; 178/18.01–18.11; 359/630–631
See application file for complete search history.

(56) References Cited

U.S. PATENT DOCUMENTS

| | | | |
|---|---|---|---|
| 4,294,543 A | 10/1981 | Apple et al. | |
| 4,703,316 A * | 10/1987 | Sherbeck | 340/706 |
| 4,811,004 A | 3/1989 | Person et al. | |
| 5,525,764 A * | 6/1996 | Junkins | 178/18 |
| 6,480,187 B1 * | 11/2002 | Sano | 345/175 |
| 2009/0091553 A1 | 4/2009 | Keam et al. | |

* cited by examiner

*Primary Examiner* — Claire X Pappas
*Assistant Examiner* — Ngan T Pham Lu
(74) *Attorney, Agent, or Firm* — Patent Law Group LLP; David C. Hsia

(57) ABSTRACT

A touch panel system includes micro-electro-mechanical system (MEMS) groups. Each group includes an emitter producing a beam, and a MEMS mirror located about a corner of a touch panel screen. The MEMS mirror reflects the beam to create a beam sweep across a touch panel surface. An array of photo sensors is located parallel to an edge of the touch panel screen to detect reflected beams from an object about the touch panel surface. Based on when the reflected beams are detected, the angular positions of the MEMS mirrors can be determined and correlated to the object's position.

21 Claims, 5 Drawing Sheets

SCANNING MIRROR TOUCH SCREEN

CROSS REFERENCE TO RELATED APPLICATIONS

This is a continuation-in-part of U.S. application Ser. No. 12/727,945, filed Mar. 19, 2010, which claims the benefit of U.S. Provisional Application No. 61/239,680, filed Sep. 3, 2009, and U.S. Provisional Application No. 61/261,270, filed Nov. 13, 2009, which are all incorporated herein by reference.

FIELD OF INVENTION

This invention relates to a touch screen, and more specifically to a touch screen that utilizes micro-electro-mechanical system (MEMS) scanning mirrors.

DESCRIPTION OF RELATED ART

A touch screen is a display that can detect the location of a touch within the display area. The term generally refers to touch or contact to the display of the device by a finger or hand. Touch screens can also sense other passive objects, such as a stylus. The touch screen has two main attributes. First, it enables one to interact with what is displayed directly on the screen, where it is displayed, rather than indirectly with a mouse or touchpad. Secondly, it lets one do so without requiring any intermediate device, again, such as a stylus that needs to be held in the hand. Such displays can be attached to computers or, as terminals, to networks. They also play a prominent role in the design of digital appliances such as satellite navigation devices, mobile phones, and video games.

SUMMARY

In one or more embodiments of the present disclosure, a touch panel system includes micro-electro-mechanical system (MEMS) groups. Each group includes an emitter producing a beam, and a MEMS mirror located about a corner of a touch panel screen. The MEMS mirror reflects the beam to create a beam sweep across a touch panel surface. An array of photo sensors is located parallel to an edge of the touch panel screen to detect reflected beams from an object about the touch panel surface. Based on when the reflected beams are detected, the angular positions of the MEMS mirrors can be determined and correlated to the object's position.

BRIEF DESCRIPTION OF THE DRAWINGS

In the drawings.

Use of the same reference numbers in different figures indicates similar or identical elements.

DETAILED DESCRIPTION OF THE INVENTION

Figure 1:
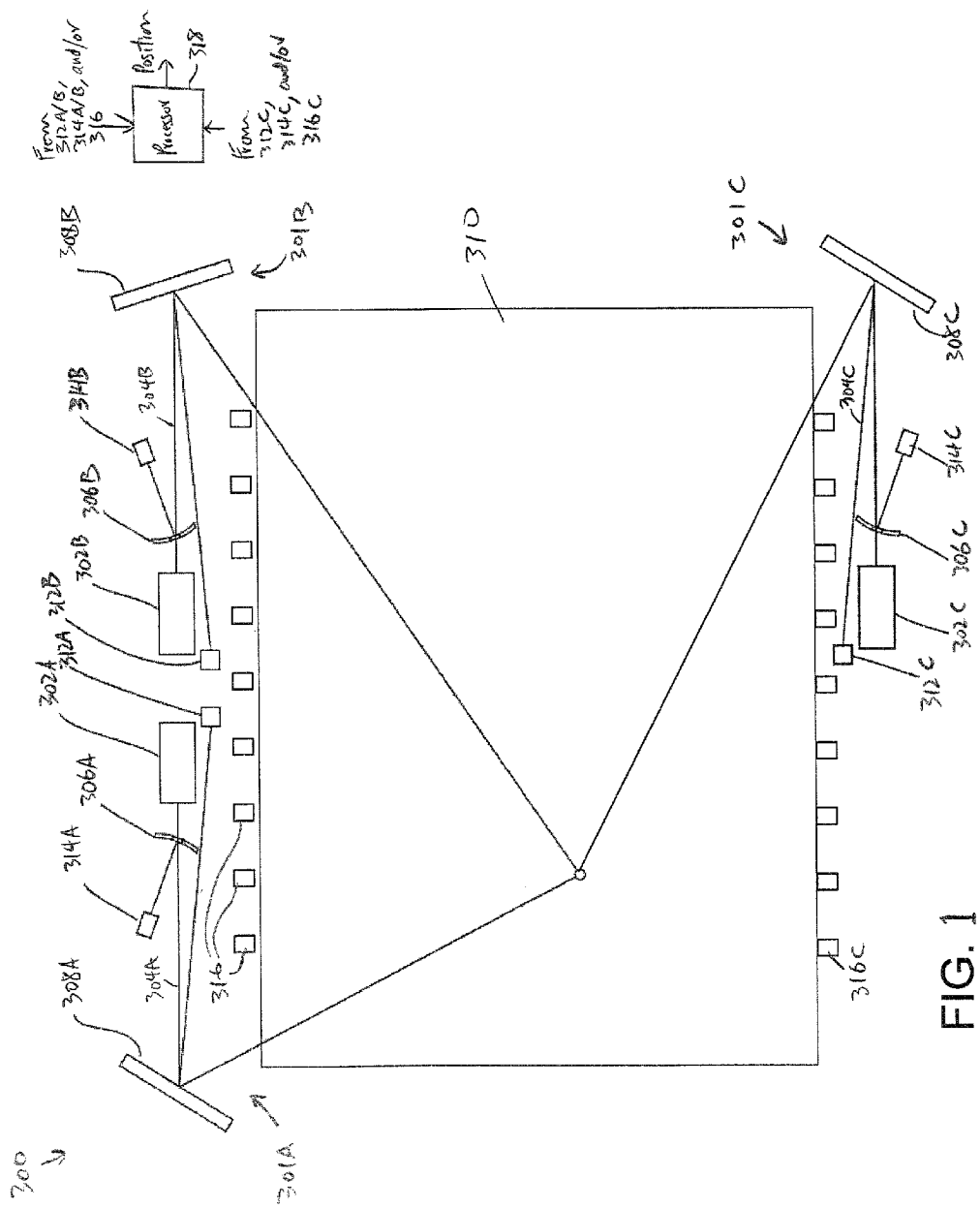
FIG. 1 illustrates a top view of a touch panel system utilizing micro-electro-mechanical system (MEMS) mirrors in one or more embodiments of the present disclosure.

FIG. 1 illustrates a top view of a touch panel system 300 utilizing micro-electro-mechanical system (MEMS) mirrors in one or more embodiments of the present disclosure. Touch panel system 300 includes a first MEMS group 301A, a second MEMS group 301B, and an optional third MEMS group 301C.

MEMS group 301A includes an emitter 302A that produces a beam 304A of laser or light, which passes through an aperture or a transparent flat window in an optional focusing device 306A and impinges an oscillating MEMS scanning mirror 308A. MEMS scanning mirror 308A is located about a corner of a screen 310. MEMS scanning mirror 308A may mechanically rotate ±22.5 degrees, which generates an optical scan angles of ±45 degrees that covers a total of 90 degrees over a screen 310. MEMS scanning mirror 308A reflects beam 304A in a sweeping motion across the surface of screen 310. Screen 310 may be part of a flat panel display or a projection screen for a projection display system.

A reference signal is generated when beam 304A is reflected by MEMS scanning mirror 308A onto an element 312A, which is either a photo sensor or a reflective surface. With a reflective surface 312A, beam 304A is reflected back into itself and onto optional focusing device 306A. Optional focusing device 306A then directs beam 304A to an optional photo sensor 314A. With a photo sensor 312A, beam 304A is directly collected by the photo sensor.

As beam 304A sweeps over screen 310, a finger or an interrupting probe in the beam path will reflect the beam, resulting in a momentary increase in intensity detected by optional photo sensor 314A. The interrupted beam 304A is reflected by MEMS scanning mirror 308A back towards optional focusing device 306A, which gathers and directs the beam towards optional photo sensor 314A. As an alternative to optional focusing device 306A and optional photo sensor 314A, an array of photo sensors 316 (only a few are labeled) is aligned along the edge of screen 310 between MEMS scanning mirror 308A and a MEMS scanning mirror 308B. Photo sensors 316 are coupled in parallel and have their lateral sensor surface facing into screen 310 to collect any reflected beam 304A.

Second MEMS group 301B is located about an adjacent corner of screen 310 in a mirror configuration to first MEMS group 301A. Notably an emitter 302B produces a beam 304B that sweeps from an element 312B, which is either a photo sensor or a reflective surface, downward into screen 310. The rest of the operations are similar to MEMS group 301A. Additional MEMS groups may be placed around screen 310 to increase the accuracy of touch panel system 300.

The reflected beam sensed by each of optional photo sensors 314A and 314B results in a reflected signal that can be compared with a respective reference signal in the time domain. The oscillation of each of MEMS scanning mirrors 308A and 308B is periodic, like a pendulum, so that a processor 318 can be programmed to compute the angular position of each of MEMS scanning mirrors 308A and 308B at the moment of interruption using a conventional formula. Processor 318 may be any conventional processor with volatile and nonvolatile memory storing instructions. Alternatively capacitive sensing is used to determine the angular positions of MEMS scanning mirrors 308A and 308B. Note that the angular positions of MEMS scanning mirrors 308A and 308B are twice the angular positions of beams 304A and 304B. Using the angular positions of MEMS scanning mirrors 308A and 308B at the moment of interruption and the distance between MEMS scanning mirrors 308A and 308B, processor 318 can be programmed to use triangulation to determine the location of interruption or "touch." The resulting touch panel system 300 is more reliable than prior devices.

Figure 2A:
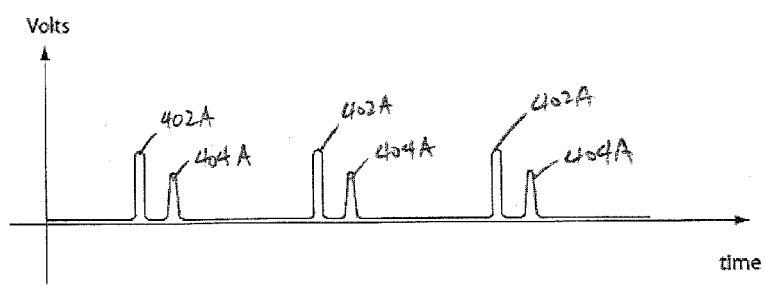
FIGS. 2A and 2B illustrate reference and reflected signals for determining a location of touch on the touch panel system of FIG. 1 in one or more embodiments of the present disclosure.

FIG. 2A shows a comparison of peaks 402A of the reference signal and peaks 404A of the reflected signal of a finger or interrupting probe on screen 310 from MEMS group 301A (FIG. 1) in one or more embodiments of the present disclosure. The reference and the reflected signals may be separate signals generated by photo sensors 312A and 314A (FIG. 1), or photo sensors 312A and 316 (FIG. 1), that are superimposed over each other. The time difference between peaks 402A and 404A is utilized to determine the angular position of MEMS scanning mirror 308A at the moment of interruption from a polar coordinate centered at MEMS scanning mirror 308A. Note that FIG. 2A assumes emitter 302A is turned on to generate beam 304A when MEMS scanning mirror 308A is rotating in one direction, and then turned off when the MEMS scanning mirror is rotating in a second direction. If emitter 302A remains on in both directions, a mirror image of the reference and reflective signals would be present.

Figure 2B:
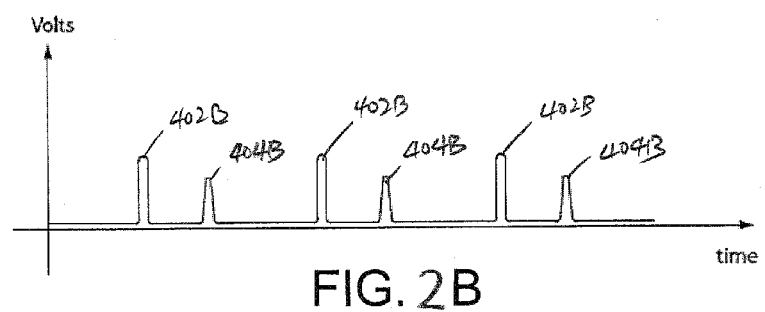

FIG. 2B shows a comparison of peaks 402B of the reference signal and peaks 404B of the reflective signal of a finger or interrupting probe on screen 310 from MEMS group 301B in one or more embodiments of the present disclosure. The time difference between peaks 402B and 404B is utilized to determine the angular position of MEMS scanning mirror 308B at the moment of interruption from another polar coordinate centered at the MEMS scanning mirror 308B. Once the angular positions of MEMS scanning mirrors 308A and 308B at the moment of interruption are determined, the XY coordinates of the finger or probe can is obtained by triangulation based on the distance between the MEMS scanning mirrors and the angular positions of the MEMS scanning mirrors.

When MEMS scanning mirrors 308A and 308B share an array of photo sensors 316, system 300 should have a method to differentiate the reflected signals for the MEMS scanning mirrors. In one method, the emitter for one MEMS scanning mirror is turned on while the emitter for the other MEMS scanning mirror is turned off when they rotate in one direction (e.g., clockwise), and vice versa. In another method, the MEMS scanning mirrors have different scanning periods. The correspondence between the reflected signals and their respective MEMS scanning mirrors is then determined based on the periodic pattern of the reflected signals.

Referring back to FIG. 1, optional third MEMS group 301C provides additional information for processor 318 to determine the XY coordinates of the finger or probe. The additional information helps to increase the resolution of touch detection. The additional information also helps to resolve any ambiguities generated by simultaneously touches on screen 310, which may otherwise have two solutions based on the angular positions of only two MEMS scanning mirrors.

Figure 3:
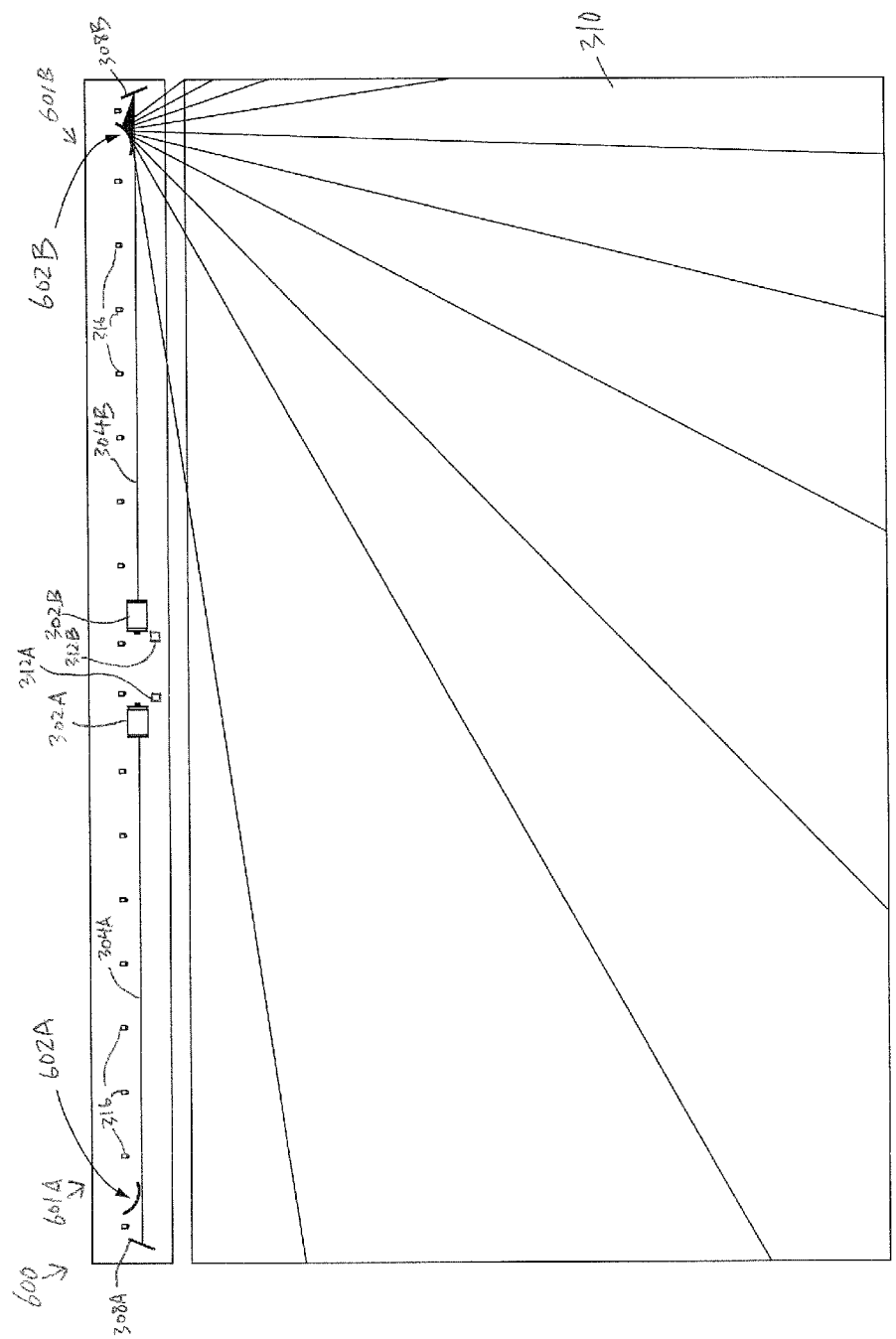
FIG. 3 illustrates a top view of another touch panel system in one or more embodiments of the present disclosure.

FIG. 3 illustrates a top view of a touch panel system 600 utilizing MEMS mirrors in one or more embodiments of the present disclosure. Touch panel system 600 includes a first MEMS group 601A and a second MEMS group 601B.

Figure 4A:
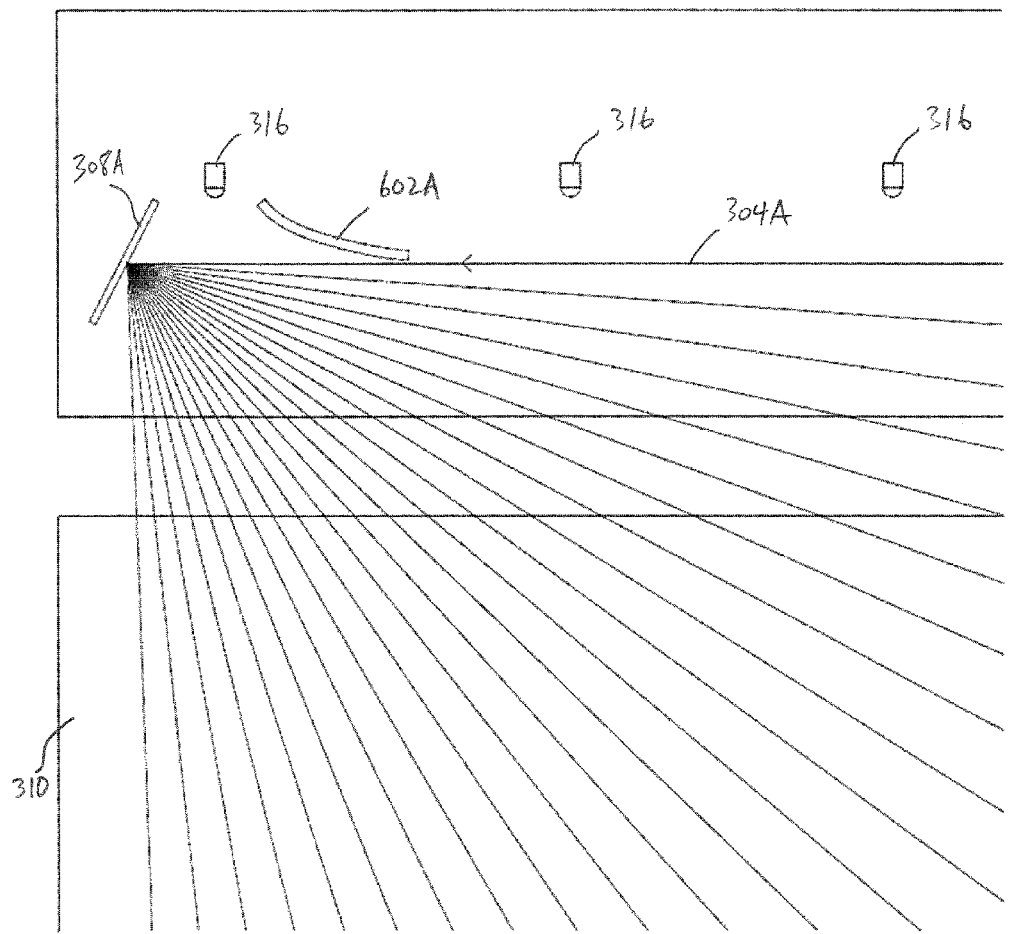
FIG. 4A illustrates an enlarged view of the touch panel system of FIG. 3 demonstrating a MEMS scanning mirror reflecting a beam to generate a first sweep over a screen in one or more embodiments of the present disclosure.
Figure 4B:
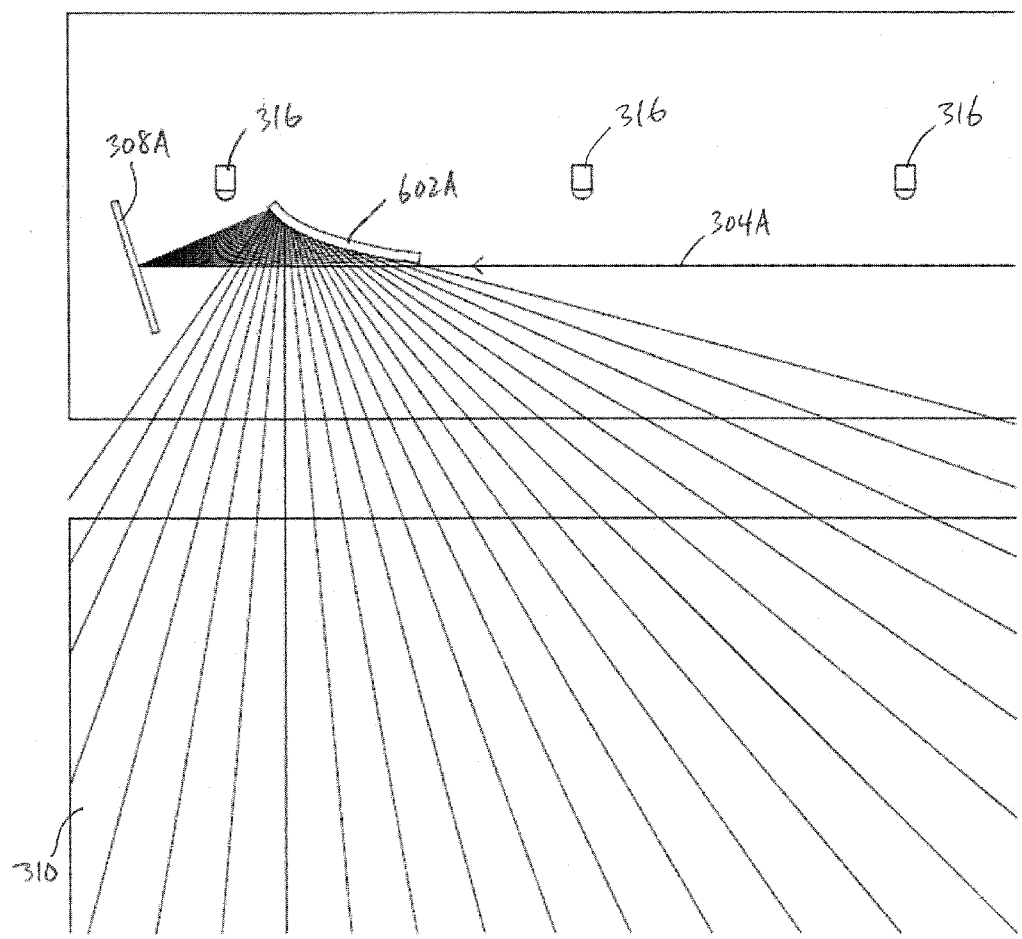
FIG. 4B illustrates another enlarged view of the touch panel system of FIG. 3 demonstrating the MEMS scanning mirror reflecting the beam over a stationary mirror to generate a second sweep over the screen in one or more embodiments of the present disclosure.

MEMS group 601A includes an emitter 302A that produces a beam 304A impinging an MEMS scanning mirror 308A. MEMS scanning mirror 308A is located about a corner of screen 310. In a first part of a rotation in one direction illustrated in FIG. 4A, MEMS scanning mirror 308A sweeps beam 304A over the surface of a screen 310. In a second part of the rotation in the same direction illustrated in FIG. 4B, MEMS scanning mirror 308A sweeps beam 304A over the surface of a stationary curved mirror 602A, which reflects and sweeps beam 304A over the surface of screen 310 a second time from a different vantage point. Photo sensors 316 have their lateral sensor surface facing into screen 310 to collect any reflected beam 304A. Photo sensors 316 may be coupled in parallel to generate reflected signals. A reference signal is generated when beam 304A is reflected by MEMS scanning mirror 308A onto a photo sensor 312A.

In one rotation of MEMS scanning mirror 308A, the described configuration provides two sweeps of beam 304A over screen 310 from two different vantage points. A finger or an interrupting probe may twice reflect beam 304A, resulting in two momentary increases in intensity detected by the array of photo sensors 316.

Emitter 302A may be turned on to generate beam 304A when MEMS scanning mirror 308A is rotating in a first direction, and then turned off when MEMS scanning mirror 308A is rotating in a second direction. If emitter 302A remains on in both directions, photo sensors 316 would detect the reference signal twice and each reflected signal twice.

In one or more embodiments, second MEMS group 601B is located about an adjacent corner of screen 310 in a mirror configuration to first MEMS group 601A. Notably emitter 302B produces a beam 304B that produces a first sweep over the surface of screen 310 from MEMS scanning mirror 308B, and a second sweep over the surface of screen 310 from a stationary curved mirror 602B. The operations are similar to MEMS group 601A. Second MEMS group 601B may be optionally devoid of stationary mirror 602B.

The reflected beams sensed by the array of photo sensors 316 generate reflected signals that can be compared with reference signals in the time domain. The oscillation of each of MEMS scanning mirrors 308A and 308B is periodic so that a processor 318 can compute the angular position of each of MEMS scanning mirrors 308A and 308B at moments of interruption using a conventional formula. Alternatively capacitive sensing is used to determine the angular positions of MEMS scanning mirrors 308A and 308B. Processor 318 uses triangulation to determine the location of interruption or "touch" from the angular positions of MEMS scanning mirrors 308A and 308B at the moments of interruption and the geometry of the MEMS scanning mirrors and the stationary curved mirrors, such as the distance between the MEMS scanning mirrors, the distance between each MEMS scanning mirrors and each stationary curved mirror, the distance between the stationary curved mirror, and the shape of the stationary curved mirrors.

In the above described configuration, the second sweeps of beams 304A and 304B provide additional information for processor 318 to determine the XY coordinates of the finger or probe. The additional information helps to increase the resolution of touch detection. The additional information also helps to resolve any ambiguities caused by simultaneous touches on screen 310, which may otherwise have multiple solutions based on two angular positions.

As MEMS scanning mirrors 308A and 308B share an array of photo sensors 316, system 600 uses a method to differentiate the reflected signals for the MEMS scanning mirrors. In one method, the emitter for one MEMS scanning mirror is turned on while the emitter for the other MEMS scanning mirror is turned off when they rotate in one direction (e.g., clockwise), and vice versa. In another method, the MEMS scanning mirrors have different scanning periods. The correspondence between the reflected signals and their respective MEMS scanning mirrors is then determined based on the periodic pattern of the reflected signals.

In one or more embodiments of system 300 and 600, photo sensors 316 are not coupled in parallel and each generate an individual output signal to processor 318. The individual output signals form pixels of a one-dimensional image of any object or objects on screen 310. Processor 318 can be programmed to determine the angles of MEMS scanning mirrors 308A and 308B from the reflected and the reference signals using triangulation as described above. Furthermore, processor 318 can be programmed to use the image to resolve any ambiguities caused by simultaneous touches on screen 310.

In a first example, assume there are two angles a1 and a2 associated with one object, one angle from MEMS scanning mirror 308A and another angle from MEMS scanning mirror 308B. Photo sensors 316 return the image of the object. Processor 318 can be programmed to determine the x-coordinate of the object as the x-coordinate of the brightest pixel in the image.

Given angles a1 and a2 and the distance between MEMS scanning mirror 308A and 308B, processor 318 can determine the x and y-coordinates of the object using triangulation. The x-coordinate of the object should match with the x-coordinates from the image.

In a second example, assume there are four angles <a11, a12> and <a21, a22> from MEMS scanning mirror 308A and MEMS scanning mirror 308B, respectively. The image gives two x-coordinates x1 and x2. Processor 318 can be programmed to determine four pairs of coordinates from the four angles from triangulation:
  1. <x11, y12> from <a11, a21>,
  2. <x21, y22> from <a11, a22>,
  3. <x31, y32> from <a12, a21>, and
  4. <x41, y42> from <a12, a22>.

Next processor 318 compares the four x-coordinates x11, x21, x31, and x41 from triangulation with the two x-coordinates x1 and x2 from the image. The ones that match determine the valid angle combination. The above method can be generalized for any number of objects. The above method can also be generalized for any number of MEMS scanning mirrors where multiple sweeps from different vantage points using one MEMS scanning mirror can be considered multiple MEMS scanning mirrors.

Various other adaptations and combinations of features of the embodiments disclosed are within the scope of the invention. Numerous embodiments are encompassed by the following claims.

The invention claimed is:
1. A touch panel system, comprising:
a first micro-electro-mechanical system (MEMS) group, comprising:
  a first emitter producing a first beam;
  a first MEMS mirror located about a first corner of a touch panel screen, the first MEMS mirror reflecting the first beam to create a first beam sweep across a touch panel surface;
a second MEMs group, comprising:
  a second emitter producing a second beam; and
  a second MEMS mirror located about a second corner of the touch panel screen, the second MEMS mirror reflecting the second beam to create a second beam sweep across the touch panel surface; and
a plurality of photo sensors located parallel to an edge of the touch panel screen between the first and the second corners, the photo sensors receiving the first and the second beams when the first and the second beams are reflected from an object about the touch panel surface, the photo sensors generating reflected signals in response to the first and the second beams.

2. The touch panel system of claim 1, wherein the first MEMS group further comprises:
a first stationary mirror; and
the first MEMS mirror further reflects the first beam to the first stationary mirror, which reflects the second beam to create a third beam sweep across the touch panel surface.

3. The touch panel system of claim 2, wherein second MEMS group further comprises:
a second stationary mirror; and
the second MEMS mirror further reflects the second beam to the second stationary mirror, which reflects the second beam to create a fourth beam sweep across the touch panel surface.

4. The touch panel system of claim 2, further comprising:
a first photo sensor receiving the first beam reflected from the first MEMS mirror, the first photo sensor generating a first reference signal in response to the first beam; and
a second photo sensor receiving the second beam reflected from the second MEMS mirror, the second photo sensor generating a second reference signal in response to the second beam.

5. The touch panel system of claim 4, further comprising:
a processor being programmed to determine coordinates of the object from the reflected signals and the first and the second reference signals.

6. The touch panel system of claim 5, wherein the photo sensors are coupled in parallel to the processor.

7. The touch panel system of claim 5, wherein the photo sensors are individually coupled to the processor, and the processor being programmed to determine a coordinate of the object along a direction based on the output signals from the photo sensors.

8. The touch panel system of claim 1, further comprising:
a third MEMS group, comprising:
  a third emitter producing a third beam;
  a third MEMS mirror located about a third corner of the touch panel screen, the third MEMS mirror reflecting the third beam to create a third sweep across the touch panel surface; and
a plurality of other photo sensors located parallel to another edge of the touch panel screen between the third corner and a fourth corner of the touch panel screen, the other photo sensors receiving the third beam when the third beam is reflected from the object, the other photo sensors generating another reflected signal in response to the third beam.

9. The touch panel system of claim 8, further comprising:
a first photo sensor receiving the first beam reflected from the first MEMS mirror, the first photo sensor generating a first reference signal in response to the first beam;
a second photo sensor receiving the second beam reflected from the second MEMS mirror, the second photo sensor generating a second reference signal in response to the second beam; and
a third photo sensor receiving the third beam reflected from the third MEMS mirror, the third photo sensor generating a third reference signal in response to the third beam.

10. The touch panel system of claim 9, further comprising:
a processor being programmed to determine coordinates of the object from the reflected signals and the first, the second, and the third reference signals.

11. A method for providing a touch screen display, comprising:
producing a first beam;
reflecting the first beam, with a first MEMS mirror located about a first corner of a touch panel screen, to create a first beam sweep across a touch panel surface;
producing a second beam;
reflecting the second beam, with a second MEMS mirror located about a second corner of the touch panel screen, to create a second beam sweep across the touch panel surface; and
detecting the first and the second beams reflected from an object about the touch panel surface, using a plurality of photo sensors parallel to an edge of the touch panel screen between the first and the second corners, to generate reflected signals.

12. The method of claim 11, further comprising:
further reflecting the first beam, with the first MEMS mirror to a first stationary mirror, to create a third beam sweep across the touch panel surface.

13. The method of claim 12, further comprising:
further reflecting the second beam, with the second MEMS mirror to a second stationary mirror, to create a fourth beam sweep across the touch panel surface.

14. The method of claim 12, further comprising:
detecting the first beam reflected from the first MEMS mirror to generate a first reference signal; and
detecting the second beam reflected from the second MEMS mirror to generate a second reference signal.

15. The method of claim 14, further comprising:
determining coordinates of the object from the reflected signals and the first and the second reference signals.

16. The method of claim 15, wherein the photo sensors are coupled in parallel to provide a single output signal.

17. The method of claim 15, wherein the photo sensors provide individual output signals, the method further comprising determining a coordinate of the object along a direction based on the output signals from the photo sensors.

18. The method of claim 11, further comprising:
producing a third beam;
reflecting the third beam, with a third MEMS mirror located about a third corner of the touch panel screen, to create a third beam sweep across the touch panel surface; and
detecting the third beam reflected from the object about the touch panel surface, using another plurality of other photo sensors parallel to another edge of the touch panel screen between the third corner and a fourth corner of the touch panel screen, to generate an other reflected signal.

19. The method of claim 18, further comprising:
detecting the first beam reflected from the first MEMS mirror to generate a first reference signal;
detecting the second beam reflected from the second MEMS mirror to generate a second reference signal; and
detecting the third beam reflected from the third MEMS mirror to generate a third reference signal.

20. The method of claim 19, further comprising:
determining coordinates of the object from the reflected signals, the other reflected signal, and the first, the second, and the third reference signals.

21. The method of claim 11, wherein said producing the first beam occurs when the first MEMS mirror rotates in one direction and the said producing the second beam occurs when the second MEMS mirror rotates in another direction.

* * * * *